United States Patent [19]
Nix

[11] Patent Number: 5,308,187
[45] Date of Patent: May 3, 1994

[54] PARKING LOT PAVEMENT FOR MAKING HOT PRECOMBUSTION AIR FOR A FOSSIL FUEL BURNER

[76] Inventor: Martin E. Nix, P.O. Box 95173, Seattle, Wash. 98105-2105

[21] Appl. No.: 63,159

[22] Filed: May 17, 1993

[51] Int. Cl.$^5$ .......................... E01C 11/26; F24J 2/24
[52] U.S. Cl. ...................................... 404/17; 404/71; 404/22; 60/641.8; 126/647
[58] Field of Search ................ 404/17, 22, 79, 71; 237/1 R; 126/517, 534, 561, 563, 569, 714, 647; 60/641.12, 641.14, 641.8, 641.13

[56] References Cited

U.S. PATENT DOCUMENTS

| | | | |
|---|---|---|---|
| 2,505,622 | 4/1950 | McKee | 237/1 R |
| 4,132,074 | 1/1979 | Wendel | 60/641 |
| 4,318,393 | 3/1982 | Goldstein | 126/438 |
| 4,481,774 | 11/1984 | Snook | 60/641.14 |
| 4,515,151 | 5/1985 | Siemmons et al. | 126/569 X |

FOREIGN PATENT DOCUMENTS

| | | | |
|---|---|---|---|
| 3915833 | 11/1990 | Fed. Rep. of Germany | |
| 178602 | 7/1989 | Japan | 404/79 |

Primary Examiner—Ramon S. Britts
Assistant Examiner—James A. Lisehora

[57] ABSTRACT

A method of making hot air in the range of 200 degrees (F) from the sunlight striking the paved surface of a parking lot is described. The transparent surface is above an opaque surface forming a homogeneous solid. Beneath the pavement are parallel pipes for the movement of air. The air is compressed into the pipe and sucked out of the pipes via photovoltaic powered fans. Due to the heat transfer through the walls of the pipes, ambient air is made hot. The hot air can then be used economically as precombustion air to a typical fossil fuel burner as oil, coal or gas. While the hot air would not be able to provide enough heat to power an entire power plant or oil refinery, the net result is more efficient fuel burning, with less air pollution produced, perhaps reducing fuel consumption by 5 to 10 percent. While the parking lot pavement may be made of recycled materials as glass or plastic, the pavement is still capable of supporting the weight of an automobile while also producing hot air.

1 Claim, 1 Drawing Sheet

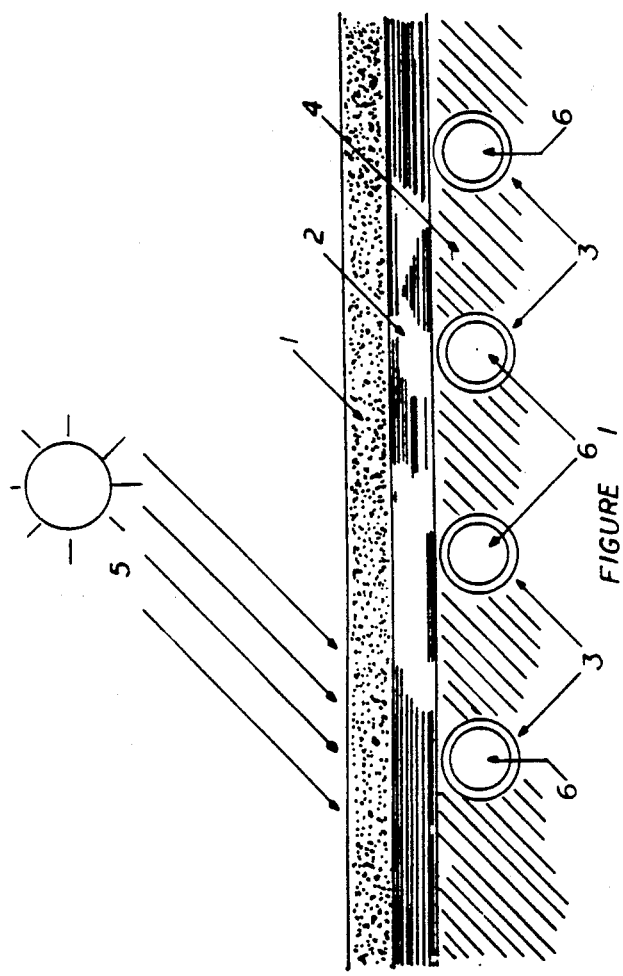

PARKING LOT PAVEMENT FOR MAKING HOT PRECOMBUSTION AIR FOR A FOSSIL FUEL BURNER

DESCRIPTION OF PRIOR ART

Solar energy has been utilized beneficially by mankind for centuries. One of the earliest solar collectors is a greenhouse producing temperatures in the 100 degrees (F) range. Even hotter temperatures in the 200 degrees (F) can be achieved with flatplate solar collectors. While still hotter temperatures above 500 degrees (F) can be achieved by focusing sunlight via lenses or parabolic concave reflectors unto a small focal area. The disclosed device is of the flatplate type.

SUMMARY OF INVENTION

The system for heating air with solar energy and supplying the air to a fossil fuel burner comprises an opaque pavement layer overlying a ground surface, an upper transparent layer formed on the pavement, and a plurality of parallel pipes within the ground surface beneath the pavement layer, the pipes carrying air and transferring heat between the ground surface and the air.

BRIEF DESCRIPTION OF THE DRAWINGS

FIG. 1 is a cross-sectional horizontal view of the functioning components of the invention.

DESCRIPTION OF THE PREFERRED EMBODIMENT

A method of production of hot air (6) from solar radiation (5) is shown illustrated in FIG. 1. Sunlight (5) travels through an upper transparent surface (1) and travels transversely until the sunlight strikes an opaque subsurface (2). The net effect of the upper transparent surface (1) and the opaque subsurface (2) is to form a homogeneous solid which functions to generate heat in the 200 degrees (F) range. The upper transparent surface (1) insulates the heat generated from the opaquer subsurface (2) while also providing insolation.

So as to reduce the cost of construction the upper transparent surface (1) may be made of recycled materials as finely ground clear plastic and glass. The opaque subsurface (2) may also be made of recycled materials as dark glass, flyash and plastic. Via method of compression as a heavy roller, the mixture of recycled materials is made into a homogeneous solid pavement capable of supporting the heavy weight of an automobile.

Beneath the pavement (1)(2) is a network of evenly spaced and parallel pipes (3). These pipes (3) serve as a suitable means to move air (6). As the air (6) moves through the pipes (3) the air (6) becomes hotter due to the transfer of heat through the walls of the pipe (3), and due to the heating effect of the opaque subsurface (3) upon the surrounding ground (4) and the pipes' walls (3), the net result is manufacturing hot air (6).

The air (6) is moved through the pipes (3) via solar powered photovoltaic fans. The air (6) is sucked and/or compressed so as to overcome the friction of the moving air (6) on the walls of the pipe (3). The pipes (3) are laid parallel and buried in the ground (4). Then the pavement (1)(2) is paved over the top of the pipes (3) and ground (4), forming a functioning heat transfer unit.

This homogeneous solid becomes suitable as parking lot pavement while also serving the economic function of collecting sunlight like a solar collector.

It can be shown that the amount of sunlight striking upon the United States' parking lots could in theory provide a significant amount of energy, if a cost effective means of collecting the energy could be achieved.

This parking lot pavement would thus be able to provide air (6) in the 200 degree (F) range which air (6) could be used for a hot water heater.

However, hot air (6) can also be more economically utilized as precombustion air for a fossil fuel burner as oil, gas or coal. Presently, most fossil fuel burners use outside ambient air, however by mixing hot air with a fuel as oil, coal or gas, less fuel is burned to achieve the same results. Furthermore, the hot air results in more efficient combustion of the fuel, thus alleviating some air pollution. It should be noted that hot air is less dense than cold air, however the compression from solar powered photovoltaic fans does compress the hot air at the fossil fuel burner. The net result is solar energy is used to move the air (6) while solar energy is used to compress the hot air (6) while also solar energy is used to make ambient air hot. Thus, no parasitic load is placed upon a power plant. The hot air (6) produced from the parking lot pavement will be about 200 degrees (F). The hot air (6) will not be sufficient to power the entire heat load of a power plant or oil refinery, but should be able to supply 5 to 10 percent of the heat load as precombustion air. The net result is an increase in overall efficiency.

What is claimed is:

1. A system for heating air with solar energy and for supplying the air to a fossil fuel burner, said system comprising;
    (a) an opaque pavement layer overlying a ground surface, said pavement layer having a pavement top surface;
    (b) an upper transparent layer formed on said pavement top surface, said upper transparent layer being transparent to sunlight and formed of a material which traps heat generated by said opaque pavement layer; and
    (c) a plurality of parallel pipes within the ground surface beneath said pavement layer, said pipes carrying air and transferring heat between said ground surface and said air.

* * * * *